United States Patent [19]

Celikkaya et al.

[11] Patent Number: 5,641,330

[45] Date of Patent: Jun. 24, 1997

[54] METHOD OF MAKING ALUMINA ABRASIVE GRAIN HAVING A METAL NITRIDE COATING THEREON

[75] Inventors: Ahmet Celikkaya; Gregory D. Allen, both of Woodbury, Minn.

[73] Assignee: Minnesota Mining and Manufacturing Company, St. Paul, Minn.

[21] Appl. No.: 563,366

[22] Filed: Nov. 28, 1995

[51] Int. Cl.⁶ ............................................. C09C 1/68
[52] U.S. Cl. .......................... 51/309; 51/293; 51/295
[58] Field of Search .......................... 51/293, 295, 309; 427/215, 255, 255.4, 377

[56] References Cited

U.S. PATENT DOCUMENTS

| | | |
|---|---|---|
| 2,404,598 | 7/1946 | Sachse . |
| 3,520,667 | 7/1970 | Taylor . |
| 4,278,449 | 7/1981 | Helletsberger et al. . |
| 4,505,720 | 3/1985 | Gabor et al. . |
| 4,606,738 | 8/1986 | Hayden . |
| 4,643,983 | 2/1987 | Zeiringer .................... 501/87 |
| 4,881,951 | 11/1989 | Wood et al. . |
| 4,913,708 | 4/1990 | Kalinowski . |
| 4,997,461 | 3/1991 | Markhoff-Matheny et al. . |
| 5,011,508 | 4/1991 | Wald et al. . |
| 5,085,671 | 2/1992 | Martin et al. . |
| 5,090,969 | 2/1992 | Oki et al. . |
| 5,106,392 | 4/1992 | Slutz et al. . |
| 5,131,926 | 7/1992 | Rostoker et al. . |
| 5,163,975 | 11/1992 | Martin ............................. 51/293 |
| 5,213,591 | 5/1993 | Celikkaya et al. . |
| 5,286,684 | 2/1994 | Otsuka et al. .................. 51/309 |
| 5,334,426 | 8/1994 | Smith . |
| 5,352,254 | 10/1994 | Celikkaya ....................... 51/295 |
| 5,380,688 | 1/1995 | Dunmead et al. ............... 51/309 |
| 5,411,763 | 5/1995 | Weaver et al. . |
| 5,429,647 | 7/1995 | Larmie .......................... 51/309 |
| 5,443,662 | 8/1995 | Arai et al. ................... 427/255.4 |
| 5,474,583 | 12/1995 | Celikkaya ....................... 51/309 |
| 5,489,204 | 2/1996 | Conwell et al. ............... 432/153 |
| 5,525,135 | 6/1996 | Moltgen et al. ............... 51/309 |
| 5,551,963 | 9/1996 | Larmie .......................... 51/309 |

FOREIGN PATENT DOCUMENTS

| | | | |
|---|---|---|---|
| 0171846A3 | 7/1985 | European Pat. Off. | C09K 3/14 |
| 0360305A2 | 3/1990 | European Pat. Off. | C23C 16/44 |
| 0361542A1 | 4/1990 | European Pat. Off. | B32B 15/02 |
| 0444824A3 | 9/1991 | European Pat. Off. | B24D 3/28 |
| 0464850A3 | 1/1992 | European Pat. Off. | C09K 3/14 |
| 2-97457 | 4/1990 | Japan | C04B 35/10 |
| WO91/17225 | 11/1991 | WIPO | C09K 3/14 |
| WO94/02561 | 2/1994 | WIPO | C09K 3/14 |
| WO94/02562 | 2/1994 | WIPO | C09K 3/14 |
| WO94/02560 | 2/1994 | WIPO | C09K 3/14 |

OTHER PUBLICATIONS

Abstract for JP,A,60 180658 Sep. 1985.
Abstract for JP,A,58 217272 Dec. 1983.
Abstract for Lee et al. "Kinetic Analysis of Chemical Vapor Deposition of Boron Nitride", American Ceramics Society, Westerville, Ohio, U.S., vol. 74, No. 10, 1991. (no month).

*Primary Examiner*—Deborah Jones
*Attorney, Agent, or Firm*—Gary L. Griswold; Walter N. Kirn; Gregory D. Allen

[57] ABSTRACT

Method for providing alpha alumina-based abrasive grain having metal nitride on at least a portion of the outer surface thereof. The abrasive grain can be incorporated into a variety of abrasive products including bonded abrasive, nonwoven abrasive, and coated abrasive products.

21 Claims, 1 Drawing Sheet

METHOD OF MAKING ALUMINA ABRASIVE GRAIN HAVING A METAL NITRIDE COATING THEREON

FIELD OF THE INVENTION

The present invention relates to a method of making alpha alumina-based abrasive grain having a metal nitride coating thereon.

DESCRIPTION OF RELATED ART

Throughout the abrasive industry, it is desired to produce an abrasive grain having improved grinding ability over currently available abrasive grain.

Diamond and cubic boron nitride (CBN), have long been known as abrasive particles or grain with very good grinding performance. Unfortunately, these grain are relatively expensive.

What is desired is an abrasive grain that has high performance characteristics yet is relatively inexpensive. One approach is to place a high performance coating on an inexpensive abrasive grain core. For example, U.S. Pat. No. 4,505,720 (Gabor et al.) teaches coating silicon carbide abrasive grain with a hard refractory material comprising a metal nitride or carbide via chemical vapor deposition. Unfortunately, there is generally a high processing cost associated with chemical vapor deposition processes.

In other references, carbides (including silicon carbide and boron carbide), nitrides (including boron nitride), and borides have been coated on alumina and non-oxide abrasive grain, (see e.g., U.S. Pat. Nos. 3,520,667 (Taylor), 4,606,738 (Hayden), 5,085,671 (Martin et al.), 5,090,969 (Oki et al.) and 5,106,392 (Slutz et al.).

Further, there are numerous references disclosing an abrasive grain having a metal oxide coating thereon, (see e.g., U.S. Pat. Nos. 2,404,598 (Sachse), 4,278,449 (Helletsberger), 4,913,708 (Kalinowski), 5,011,508 (Wald et al.), 5,131,926 (Rostoker et al.), and 5,213,591 (Celikkaya et al.), PCT Application No. PCT/US93/06784 having International Publication No. WO 94/02561, published 3 Feb. 1994, and JP 2-97457, published Apr. 10, 1990.

There is still a need, however, to develop abrasive grain having a relatively inexpensive base particle with a high performance coating thereon.

SUMMARY OF THE INVENTION

The present invention provides a method for making an alpha alumina-based abrasive grain, the method comprising heating a plurality of alpha alumina-based abrasive particles each having an outer surface including metal oxide, in the presence of a carbon source (e.g., a particulate carbon source), for a time, at a temperature, and under a non-oxidizing, nitrogen containing atmosphere (e.g., nitrogen, ammonia, and combinations, although other nitrogen-containing atmospheres may also be useful), sufficient to convert at least a portion of the metal oxide to metal nitride.

The metal oxide(s) typically is selected from the group consisting of oxides of titanium, zirconium, aluminum, chromium, boron, silicon, vanadium, tantalum, hafnium, niobium, and combinations thereof.

In this application:

"alumina-based abrasive particle" refers to an abrasive grain that is at least 50% by weight alumina, calculated on a theoretical oxide basis as $Al_2O_3$;

"alpha alumina-based abrasive particle" refers to an alumina based abrasive grain comprising at least 50% by weight alpha alumina, calculated on a theoretical oxide basis as $Al_2O_3$;

"sintered, alpha alumina-based ceramic abrasive particle" refers to a sintered, polycrystalline alpha alumina-based abrasive particles having a density greater than 90% of theoretical; and "carbon source" refers sources of carbon, (e.g., carbon powder, graphite, and coke), and organic compounds (including organic compounds coated onto the surface of the abrasive particle) that provide carbon when pyrolyzed under a non-oxidizing atmosphere.

DETAILED DESCRIPTION OF PREFERRED EMBODIMENTS

Figure 1:
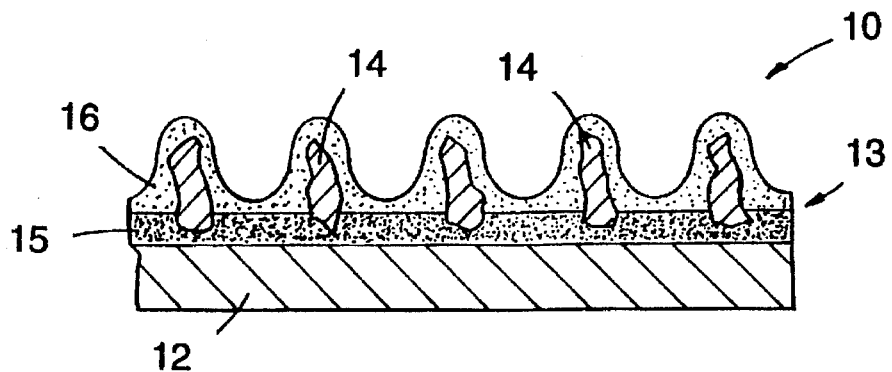
FIG. 1 is a fragmentary cross-sectional schematic view of a coated abrasive product.

The present invention pertains to a method of producing alpha alumina-based abrasive particles (preferably sintered polycrystalline alpha alumina-based abrasive particles) each having a metal nitride coating thereon.

Alpha alumina-based abrasive particles suitable for making the abrasive grain include fused alumina and ceramic alpha alumina-based abrasive particles. Fused aluminas include heat treated aluminum oxide, (available, for example, from Treibacher GmbH of Treibach, Germany, under the trade designation "BFRPL"), brown aluminum oxide, (available, for example, from Treibacher GmbH under the trade designation "EPL"), white fused aluminum oxide, pink aluminum oxide, and alumina-zirconia, (available, for example, from Norton Company of Worcester, Mass. under the trade designation "NorZon"). Naturally occurring alumina, known as corundum, is also useful in the method according to the present invention.

The particle size of the abrasive particles is typically in the range from 10 to 3000 micrometers, more typically, about 100 to 1000 micrometers. In another aspect, preferably, the particle size of the abrasive particles is sufficient to provide an ANSI Grade 24 to 80.

Alpha alumina-based ceramic abrasive particles can be produced, for example, by a sol-gel or a powder process. In a typical sol-gel process, alpha-aluminum oxide monohydrate (usually boehmite) is dispersed in water to provide a sol, which is then gelled, dried, crushed, typically calcined, and sintered to provide polycrystalline alpha alumina-based abrasive particles. Sol-gel-derived abrasive particles include those available under the "CUBITRON" trade designation from the 3M Company of St. Paul, Minn., and "SG" from Norton Company. The latter is available from Norton Company in coated and bonded abrasive products.

Alpha alumina-based abrasive particles can also be made by solution processes. For example, such particles can be made, in general, from a solution of aluminum salt, such as aluminum formoacetate (AFA), which is gelled, dried, crushed, preferably calcined, and sintered.

Alternately, alpha alumina-based ceramic abrasive particles can be produced by methods other than the sol-gel method, such as taught, for example, in U.S. Pat. No.

4,786,292 (Janz et al.) and copending U.S. Application having Ser. No. 08/333,224 (Monroe et al.), filed Nov. 2, 1994, and U.K. Pat. Appl. GB 2,186,585, published Aug. 19, 1987, the disclosures of which are incorporated herein by reference.

Additional details for making sintered polycrystalline alpha alumina-based ceramic abrasive particles are described below.

The metal oxide on the outer surface of the alumina-based abrasive particle can be obtained in a variety of methods, including those discussed below. Suitable metal oxides include oxide of titanium, zirconium, aluminum, chromium, vanadium, tantalum, hafnium, niobium, combinations thereof. For purposes of the present application, metal oxide is also intended to refer to silicon oxide.

Preferred Sintered Alpha Alumina-Based Ceramic Abrasive Particles

The Base Particle

Suitable base particles can be prepared by sol-gel process such as disclosed, for example, in U.S. Pat. Nos. 4,881,951 (Wood et al.), 4,770,671 (Monroe et al.), 4,744,802 (Schwabel), 4,574,003 (Gerk), 4,314,827 (Leitheiser et al.), 4,964,883 (Morris et al.), and 5,201,916 (Berg et al.), the disclosures of which are incorporated herein by reference, and U.S. Pat. No. 4,623,364 (Cottringer et al.).

Preferably, the precursor alpha alumina-based particles are prepared by a sol-gel process employing a dispersion comprising from about 2 to about 60 percent by weight alpha aluminum oxide monohydrate (typically boehmite), although other hydrates may be used. The weight percent is based on a total of hydrate plus liquid carrier, without regard to adjuvants or additives. The boehmite can be prepared by any of various conventional techniques, or it can be acquired commercially. Suitable boehmite is commercially available, for example, under the trade designations "DISPERAL" from Condea Chemie, GmbH, of Hamburg, Germany, and "DISPAL" from Vista Chemical Co. of Houston, Tex. These aluminum oxide monohydrates are in alpha form, are relatively pure (including relatively little, if any, hydrate phases other than monohydrate), and have a high surface area. The typical and preferred liquid carrier is deionized water.

A peptizing agent or dispersion aid may be used in the boehmite dispersion to produce a more stable hydrosol or colloidal dispersion. Monoprotic acids which may be used as the peptizing agent include acetic, hydrochloric, formic, and nitric acids. Nitric acid is preferred. Multiprotic acids are normally to be avoided since they rapidly gel the dispersion, making it difficult to handle or mix in additional components. Some commercial sources of boehmite contain an acid titer (e.g., acetic, formic, or nitric acid) to assist in forming a stable dispersion.

Mechanical mixing means, such as ball mill, pebble mill, attritor mill, or low shear mixing, are generally used to achieve the dispersion. Alternatively, ultrasonic energy can be used to aid in mixing the dispersion.

A defoamer may be added to the dispersion to aid in the reduction of froth or foam during the mixing process. Common defoamers include alcohols.

The boehmite dispersion optionally includes a precursor of an oxide modifier (e.g., oxides of magnesium, zinc, cobalt, nickel, zirconium, hafnium, iron, lithium, silicon, manganese, chromium, yttrium, calcium, sodium, strontium, praseodymium, cerium, samarium, ytterbium, neodymium, lanthanum, gadolinium, dysprosium, erbium, titanium, and mixtures thereof) which enhances some desired property of the sintered abrasive particle or increases the effectiveness of a subsequent processing step (e.g., the sintering step). Such precursors are generally introduced in the form of a salt (typically a metal salt material) soluble in the liquid carrier of the dispersion. Typically, the precursor is a water soluble metal salt.

The dispersion may contain a nucleating material to enhance the transformation of the alpha alumina precursor to alpha alumina. Suitable nucleating materials include fine particles of alpha alumina, or fine particles or precursors of alpha ferric oxide, chromia, titanates, and any other material which will nucleate the transformation. Nucleating materials are disclosed, for example, in U.S. Pat. Nos. 4,744,802 (Schwabel), 4,964,883 (Morris et al.), and 5,219,806 (Wood), the disclosures of which are incorporated herein by reference.

For additional details regarding the inclusion of manganese oxide and precursors thereof in the dispersion, see PCT Application No. PCT/US93/12441 having International Publication No. WO 94/14722, published Jul. 7, 1994, which corresponds to U.S. Ser. No. 08/459,548 filed Jun. 2, 1995, which is a continuation of U.S. Ser. No. 08/284,042, filed Aug. 1, 1994, now abandoned, which is a continuation of U.S. Ser. No. 08/230,889, filed Apr. 20, 1994, now abandoned, which is a continuation of U.S. Ser. No. 08/230,889, filed Apr. 20, 1994, now abandoned, which is a continuation of U.S. Ser. No. 08/173,401, filed Dec. 21, 1993, now abandoned, which is a continuation of U.S. Ser. No. 07/995,964, filed Dec. 23, 1992, now abandoned, the disclosure of which is incorporated herein by reference.

The dispersion can be formed by any suitable means. For example, the dispersion can be formed by simply introducing the aluminum oxide monohydrate, optional additives, and water carrier to a ball mill or other satisfactory mixing device, and mixing until the resulting dispersion is acceptable. Once the dispersion is formed, it is then gelled and/or dried (i.e., dewatered). The gel can be formed by any conventional technique such as the addition of a dissolved or dispersed metal-containing modifying additive (e.g., magnesium nitrate), or the sol can be at least partially dewatered to form the gel. Common dewatering techniques include air drying in an oven or in ambient conditions, introducing a vacuum, decanting, filtering, and pressing. Techniques such as freeze drying, liquid extraction, or the use of supercritical liquids are also suitable means for dewatering the dispersion. Drying under pressure at about 100° C. or by high pressure dewatering techniques (such as high pressure filter pressing or use of high pressure candle filters) is also useful.

If it is desired that the resulting sintered alpha alumina-based ceramic particle include zirconium oxide and/or cerium oxide, a preferred method for introducing zirconium oxide and/or cerium oxide is by adding zirconia particles and/or ceria particles to the alpha aluminum oxide monohydrate dispersion prior to gelation. These materials can be added to the dispersion as a sol or as a fine powder. For additional details regarding such zirconium and ceria additions, see copending PCT Application No. PCT/US93/08988 having International Publication No. WO 94/07809, published April 14, 1994, which corresponds to U.S. Pat. No. 5,551,963 (Larmie); and U.S. Pat. No. 5,429,647 (Larmie), the disclosures of which are incorporated herein by reference.

The gel or partially dewatered gel can be shaped or crushed into irregularly shaped particles. To provide sintered abrasive particles in the shape of, for example, a rod, triangle, pyramid, disk, diamond, cone, or similar shape. Shaping of the gel may be accomplished by conventional means such as pressing, molding, casting, extrusion or cutting, or some combination of those steps, with drying.

Rods have an aspect ratio (i.e., length to width) from about one to one, and can have an aspect ratio of three to one, five to one, and greater. Methods of producing rod or filament shaped particles are taught, for example, in U.S. Pat. No. 5,090,968 (Pellow), the disclosure of which is incorporated by reference.

Triangles, squares, or other particles having generally planar faces separated by a thickness, typically have a ratio of the shortest facial dimension to the thickness of the particle of about one to one, two to one, six to one, and greater. Such shaped abrasive particles are taught, for example, in U.S. Pat. Nos. 5,201,916 (Berg et al.) and 5,366,523 (Rowenhorst et al.), the disclosures of which are incorporated herein by reference.

Further, irregularly shaped abrasive grain products are conveniently provided, for example, by crushing dried gel to the desired particle size. Conventional crushing means include roll crushing, ball milling, and hammer milling.

Air drying steps may be used to remove water from either the shaped or unshaped gel. Drying can be accomplished, for example, in a forced air oven at a temperature in the range of about 50° C. to about 200° C., preferably between about 100° C. and 150° C. Generally, drying is conducted until the dried gel contains 1 to 40%, preferably, 5 to 20% by weight, free-water.

The dried gel is typically calcined to remove any trace water or solvent. During calcining, the dried gel is generally heated to a temperature in the range from about 400° C. to about 1000° C., preferably about 400° to about 800° C. The dried gel is held within this temperature range until the free water and preferably over 90 percent by weight of any bound volatiles are removed. If the dried gel contains a modifier precursor, the dried gel is preferably calcined for a period of time sufficient to achieve essentially complete conversion of the modifier precursor to metal oxide.

Conversion of Base Particles to Alpha Alumina-Based Particles

The base particles described above can be converted into sintered alpha alumina-based ceramic abrasive particles through application of one or more heat treatments.

To improve physical properties of the alpha alumina-based particles (e.g., to increase their density, hardness, and/or toughness) and/or improve the consistency between different abrasive particles, the base particles can be impregnated with various materials. Further, to improve the surface of the alpha alumina-based base particles with respect to adhesion to a binder and/or to provide increased surface area for bonding of grinding aid material, the base particles can be coated with inorganic particles in any of variety of ways.

Impregnation of the Base Particles with Modifier Material

General methods of impregnating particles from dried alumina hydrate dispersions are described, for example, in U.S. Pat. No. 5,164,348 (Wood), the disclosure of which is incorporated herein by reference.

In general, the base particle material (which can be calcined or uncalcined material) is porous. For example, a calcined base particle material generally has pores about 5-10 nanometers in diameter extending therein from an outer surface. Impregnation of the pores with an impregnation composition comprising appropriate modifier precursor and a liquid medium provides for increases in density and can improve toughness of the sintered alpha alumina-based particle. The modifier for impregnation (i.e., the impregnate) generally is a precursor of a metal oxide provided in the form of one or more salts of a metal (e.g., a nitrate or acetate salt). It is also within the scope of this invention to impregnate with an aluminum salt. The metal salt material is dissolved in a liquid medium, and the resulting solution is then mixed with the porous base particle material. The impregnation process is thought to occur through capillary action. The capillary action can be improved by subjecting the porous base particles to vacuum treatment before the mixing step.

The liquid media used for the impregnating composition is preferably water (including deionized water) and/or an organic solvent (preferably a nonpolar solvent). If the particulate material is calcined prior to the impregnation step, water is the preferred liquid media for the impregnation composition. If the particulate material is not calcined prior to the impregnation step, the liquid media preferred is one that will not dissolve or soften the particulate material.

The concentration of the salt in the liquid medium is typically in the range from about 5% to about 40% dissolved solids, on an oxide basis. In general, there should be at least 50 ml of solution added to achieve impregnation of 100 grams of porous base particle material, preferably, at least about 60 ml of solution to 100 grams of base particle.

In some instances, more than one impregnation step may be utilized. The same impregnation composition may be applied in repeated treatments, or subsequent impregnation compositions may contain different concentrations of the same salts, different salts, or different combinations of salts.

During heat treatment of the impregnated base particles to form the sintered, ceramic, alpha alumina-based particles, the impregnate (or modifier) may react with alumina to form a reaction product. For example, the oxides of cobalt, nickel, zinc, and magnesium typically react with alumina to form a spinel structure. Yttria typically reacts with alumina to form $3Y_2O_3 \cdot 5Al_2O_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LmMAl_{11}O_{19}$, wherein Lm is a trivalent metal ion such as La, Nd, Ce, Pt, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Hexagonal rare earth aluminates generally have exceptional properties in an abrasive particle and if present, are typically within the abrasive particle as a whisker(s) or platelet(s). Such whiskers or platelets typically have a length of about 0.5 micrometer to about 1 micrometer, and a thickness of about 0.5 micrometer or less. It is believed that the whiskers or platelets may inhibit crack propagation. These whiskers or platelets are more likely to occur in the absence of a nucleating agent.

Metal Oxide Surface Coatings

It is within the scope of the present invention to use alumina abrasive particles, as described above, which have preferably, at least about 70%, more preferably at least about 80%, of the outer surface of the abrasive particle coated with a metal oxide. The metal oxide coating can be continuous or discontinuous, and be fairly dense with no porosity, or porous. The thickness of the metal oxide coating is preferably in the range of about 0.05 to 20 micrometers, more preferably about 0.1 to 10 micrometers. Suitable metal oxides include, for example, oxide of titanium, zirconium, aluminum, vanadium, chromium, hafnium, niobium, and combinations thereof. For purposes of the present application, metal oxide is also intended to refer to silicon oxide. Various metal oxide coatings useful for this invention are described below, although the scope of this invention is not limited to these embodiments.

A Preferred Metal Oxide Surface Coating

A preferred metal oxide coating is disclosed in U.S. Pat. No. 5,474,383 (Celikkaya), the disclosure of which is incorporated herein by reference. Celikkaya teaches the coating of oxides onto the outer surface of alumina particles by coating unsintered, dried or calcined alpha alumina-based abrasive particle precursors with organometallic oxide precursors (i.e., alkoxides) which then react with water within the abrasive particle precursor to form the oxide coating.

More specifically, Celikkaya teaches a method for providing an organometallic oxide coating generally comprises steps of:

(a) providing a mass of particles comprising alpha-alumina precursor material;

(b) coating the particles with a coating composition comprising metal alkoxide to provide coated particles, the coating being capable, upon heating, of converting to a metal oxide coating which is autogenously bonded to the surface of each of the particles; and (c) heating the coated particles under conditions which convert the coating to a metal oxide coating and sinter the particles.

In general, the conversion is conducted through steps of hydrolysis to form metal hydroxide(s) and then reaction, to form metal oxide. The product, from the step of converting the metal alkoxide-containing coating on the base particles to a metal oxide coating, is then heated to a temperature and for a time sufficient to provide sintered alpha alumina abrasive particles having autogenously bond thereto a metal oxide coating.

Preferably, the base particles utilized are alumina precursors, formed from a sol-gel process as described herein in "The Base Particle". The step of converting the metal alkoxide-containing coating to a metal oxide coating preferably includes hydrolyzing the metal-alkoxide to metal hydroxide and then converting the metal hydroxide to metal oxide. The hydrolysis can be conducted with atmospheric moisture and/or residual moisture in the base particles, absorbed from the atmosphere, left over from the sol-gel process, or other processing, (e.g., impregnation). Conversion of the metal hydroxide to metal oxide can be completed through application of substantial heat, typically greater than 400° C., to the coated base particles. Conventional means may be utilized to achieve sintering.

In certain preferred applications, the base particles can be modified prior to application of the metal alkoxide containing coating thereto. Such modification generally involves provision within the base particles of metal oxides (modifier) or metal oxide precursors (modifier precursor).

A variety of materials may be utilized as the metal alkoxide, in the metal alkoxide-containing coating. For example, zirconium will be preferred for certain applications (i.e. those in which the abrasive grain are to be utilized for stainless steel grinding). However, in some applications alkoxides of titanium, aluminum, magnesium, zinc, cobalt, nickel, silicon, hafnium, iron, manganese, chromium, yttrium, praseodymium, samarium, ytterbium, neodymium, lanthanum, gadolinium, cerium, dysprosium, erbium, and mixtures of two or more thereof may be desired.

The following is a preferred formula for the metal alkoxides:

$$Z_xM(OR)_{n-x}$$

wherein:

M is a metal cation;

n is the oxidation state of M;

x is an integer having a value of 0 to n−1;

OR is an alkoxy group, wherein O is oxygen and each R group is an alkyl group; and, each Z group is independently an organic group or inorganic group.

In general, what is required is an alkoxide which is a precursor to a metal hydroxide and metal oxide as described above.

A variety of alkoxides, having a variety of R groups therein may be utilized. That is, the R alkyl group may be of a variety of formulae. In general, each R group has an organic group of 1–20 carbon atoms, preferably 3–6 carbon atoms. Since in typical processes according to the present invention the alkoxy group yields a by-product (i.e. alcohol, relatively simple (non-substituted, 3–6 carbon atoms) organic groups are preferred). If the metal alkoxide includes more than one alkoxy group thereon, each alkoxy group may be the same or selected independently of other alkoxy groups in the material.

The metal atom may include one or more organic or inorganic groups bonded directly thereto. Similarly to the organic groups in the alkoxy groups, there is no specific limitation on the nature of any organic group or inorganic group bonded directly to the metal, except that it be non-interfering with formation of a desired coating. If the metal atom includes more than one inorganic or organic group thereon, each may be the same or selected independently of the others. The metal atom may include both organic and inorganic groups thereon.

Preferably, sufficient metal alkoxide-containing coating is provided on the base particles to yield a final sintered abrasive particle having a metal oxide coating covering at least 70% of the outer surface area thereof.

In certain preferred methods according to the present invention, the porous base particles are provided with metal oxide precursor such as a metal salt, sometimes referred to as modifier material, therein prior to the step of sintering. The metal oxide precursor may be introduced into the base particles by impregnation conducted simultaneously with, before, or after coating with the inorganic particles. In general, the step of impregnation comprises mixing porous base particles with a carrier liquid having the modifier or its precursor (e.g., a metal salt) dissolved therein.

Particulate Metal Oxide Surface Coatings

The coating of inorganic metal oxide particulates on the base particle provides a (sintered) abrasive particle having an increased surface area for improved adhesion to the bond system and/or increased surface area for the metal nitride coating. Preferably, the particulate metal oxide coating on the sintered abrasive particle (or abrasive core) is relatively porous.

Preferably, at least 70% (more preferably, at least 80%) of the surface area of the sintered alpha alumina-based particle (or core) is covered with the inorganic metal oxide particulate coating, although greater than 90% coverage may be obtained. With respect to the amount of coverage, reference is made to the amount of exposed sintered particle (core) surface in the resulting coated abrasive particle. Thus, coverage of at least 70% means that no more than about 30% of the total area of the underlying sintered base particle surface is exposed (i.e., not covered with particulates). The amount of coverage in this context is not meant to refer to the nature (e.g., porosity or density) of the particulate coating. The coating can be continuous or discontinuous.

The density of the metal oxide coating is typically less than 90% (preferably less than 80%) of theoretical. Most preferably, the coating has a density of at least 40%, but less than 70% of theoretical. This is not meant, however, to imply that the coating is discontinuous, but rather to reflect that pores extend therethrough. Further, the density value given is meant to refer to the average density of the coating, not the density of the individual fused particulates that make up the coating (i.e., the coating comprises dense particulates packed together with some open space therebetween).

During sintering, the inorganic metal oxide particulates in the coating typically sinter to one another resulting in a coating having good structural integrity. The resulting coating may contain more than one layer of inorganic metal oxide particulates. Typically, there are 2 to 30 layers, more typically, 3 to 20 layers of particulates. Preferably, at least 5 to 15 layers of inorganic metal oxide particulates are provided, stacked on one another.

The inorganic metal oxide particulates can comprise, for example, transitional alumina, alpha alumina, hydrated aluminas, yttria, magnesia, rare earth metal oxides, zinc oxide, iron oxide, silicates, chromium oxide, titanium oxide, nickel oxide, yttria alumina, garnet, hexagonal rare earth aluminate, alumina-zirconia, zirconium oxide, alumina oxynitride, silicon aluminum oxynitride, silicon aluminum oxycarbide, and combinations thereof.

U.S. Pat. No. 5,011,508 (Wald et al.), the disclosure of which is incorporated herein by reference, describes autogenously bonding fine inorganic metal oxide (e.g., alumina) particulates to the surface of a calcined base particle and then sintering to provide an abrasive particle having a particulate metal oxide coating.

A Preferred Particulate Metal Oxide Surface Coating

A preferred metal oxide particulate surface coating is described in U.S. Pat. No. 5,213,591 (Celikkaya et al.), the disclosure of which is incorporated herein by reference. More specifically, Celikkaya et al. teach an alpha alumina-based ceramic abrasive particle comprising an alpha alumina-based core having a coating of inorganic metal oxide particulates autogenously bonded thereto.

In one preferred process, a coating composition comprising inorganic metal oxide particulates and a liquid medium (e.g., water or an organic solvent) is applied to (or coated onto) the calcined or uncalcined (i.e., dried gel) base particles. Generally, if the liquid medium is water or a polar organic solvent, the base particle should be calcined before applying the coating. If, however, the liquid medium is a non-polar organic solvent, it is not necessary to calcine the base particle prior to coating.

Generally, the coating composition comprises in the range from about 0.01% to about 20% (preferably about 0.1% to about 5%) by weight oxide organic metal oxide particulates, wherein the weight percentage is based on the weight of particulate, plus carrier liquid (e.g., water or acetone), without regard to other additives or adjuvants. The coating composition may include adjuvants such as wetting agents or dispersing agents, typically in amounts effective to provide the properties desired to the mixture or dispersion. The coating composition, which typically is a suspension, may be formed by any conventional means, such as mixing with a continuous mixer, batch mixer, ball milling device, cement mixer, a vibrator, or a tumbler.

The coating composition can be applied, for example, by mixing base particles with the coating composition. Suitable mixing techniques include those using a screw auger, a batch mixer, a continuous mixer, a cement mixer, a vibrator, or a tumbler. One preferred technique is to feed the coating composition and base particles into a continuous mixer from individual feed streams.

To provide a substantially uniform coating of inorganic metal oxide particulates on the base particles, a minimum ratio of volume of carrier liquid to weight of particles to be coated is preferred. Generally, at least 50 ml of liquid volume is the minimum preferred in order to ensure good inorganic metal oxide particulate coating of 100 grams of base particle material. Preferably, about a 20% excess of liquid volume over this amount (i.e., 60 ml liquid per 100 grams of base particle material) is desirable to ensure good coating and processing. It is noted that this ratio is the same ratio presented hereinabove for preferred impregnation of the base particle material.

The base particles are typically porous (i.e., they usually have an open porosity including relatively small pores (5–10 nanometers) therein). Such pores are typically too small for penetration of the inorganic metal oxide particulates. Through capillary action, the liquid is pulled into the pores bringing the inorganic metal oxide particulates to the surface of each base particle. This facilitates provision of a desirable even coat, provided sufficient coating composition is used, with substantially complete coverage of the outer surface of each base particle is obtained. Preferably, sufficient liquid is used to saturate (or at least 70% saturate) the base particles.

Following coating, the coated base particles are dried such that they do not stick together. It is foreseen that, in typical applications, the coated base particles are dried by forced air drying at temperatures of about 100° C. to about 150° C. Preferably, excess liquid is removed, for example, by decanting prior to drying.

The thickness of the dried coating is generally in the range from about 0.1 to about 20 micrometers (preferably about 0.5 to about 10 micrometers), and, most preferably, in the range from about 0.5 to about 2 micrometers. The amount of coating can also be calculated on the basis of weight percent of coating relative to the base particle. Typically, the coating preferably comprises, on average, in the range from greater than 0.01 to about 10 percent by weight, based on the weight of the coated inorganic metal oxide particulates and the base particle before application of the inorganic metal oxide particulates.

Alternate methods of providing a particulate coating on the base particles are possible. For example, if the base particles are wet (substantially saturated, i.e., at least 70%, preferably 100% of the pore volume is filled with liquid and a liquid film is present on the surface of the base particles), for example, with water, a coating can be provided by adding (e.g., sprinkling) inorganic metal oxide particulate to the wet base particles or other mixing. In general, the liquid (typically water) on the surface of each base particle acts as a binder to attract and retain the inorganic metal oxide particulates thereby aiding in the formation of a coating. Further, base particles and inorganic metal oxide particulates may be mixed together dry, followed by the addition of liquid (typically water) and sufficient mixing to distribute the liquid and provide a coating of inorganic metal oxide particulates on the base particles. Generally, sufficient liquid should be used to achieve substantial saturation as defined above, since the liquid serves as a temporary binder for the coating.

Further, it is possible to first impregnate porous base particles with an impregnating composition and then coat the (wet) impregnated base particles with (dry) inorganic metal oxide particulates. Alternately, in some instances, impregnation may be conducted after first providing a coating of inorganic metal oxide particulate. The latter process is possible because the coating is relatively porous.

If the base particles are mixed with a liquid medium which contains modifier precursor (as described above), while at the same time having inorganic metal oxide particulates (as described above) suspended therein, both impregnation and inorganic metal oxide particulate coating can result simultaneously.

The inorganic coating preferably covers at least 70% of the outer surface of the sintered core, and preferably is at least about 0.1 micrometer thick.

A method of making preferred alpha alumina-based ceramic abrasive particles comprises the steps of:

(a) providing a mass of porous base abrasive particles comprising alpha alumina precursor material, each particle of which is sinterable to an alpha alumina-based abrasive particle;

(b) mixing with the mass, in the presence of a liquid, inorganic metal oxide particulates having the same or different composition and being much finer than the base particles until the inorganic metal oxide particulates are distributed over the exterior surface of each base particle, the particulates being capable of autogenous bonding to the exterior surface of the base particles upon sintering; and (c) heating the particles to remove the liquid and sinter the base particles, where autogenous bonding of the inorganic metal oxide particulates to the exterior surface of each of the base particles occurs to provide sintered alpha alumina-based ceramic particles.

Generally, step (b) is selected from the group consisting of:

(A) (i) adding the inorganic metal oxide particulates to the liquid to provide a dispersion; and (ii) adding the dispersion to the porous base particles; and (B) (i) adding the liquid to the porous base particles to provide liquid-impregnated particles; and (ii) mixing inorganic metal oxide particulates with the liquid impregnated particles.

Preferably the inorganic metal oxide particulate has an average particle size in the range from about 0.01 to about 20 micrometers, and more preferably less than about 1 micrometer.

Following the step of coating the porous base particles, the coated material (i.e., coated base particles) is heated to remove the liquid and then sintered to provide ceramic abrasive particles. The step of sintering converts each porous base particle to a dense alpha alumina-based core, with the inorganic metal oxide particulates forming an autogenously bonded coating thereon.

Other methods for providing other treatments and coatings of the abrasive particles known in the abrasive art (e.g., oxide coatings other than described above) may be useful in the preparation of abrasive particles for use in the method according to the present invention.

Sintering

The base particles or treated (e.g., impregnated, tumbled, and/or coated) base particles are precursors to ceramic abrasive particles.

The sintering of the precursor particles can be accomplished through a variety of conventional processes. Typically, sintering is conducted at a temperature in the range from about 1200° C. to about 1650° C. Sintering generally can be accomplished within a time period of a few seconds to about 120 minutes. Sintering of various types of base particles is described, in general, in U.S. Pat. No. 4,314,827 (Leitheiser et al.), the disclosure of which is incorporated herein by reference. Another type of kiln useful for the sintering of the base particles, is described, for example, in U.S. Pat. No. 5,489,204 (Conwell et al.), the disclosure of which is incorporated herein by reference. The techniques of sintering applied therein may be applied to treated base particles as described herein. It is also within the scope of this invention to sinter in an inert or reducing atmosphere.

Nitride Coating

The method of the present invention includes heating alpha alumina-based abrasive particles in the presence of a carbon source under a non-oxidizing, nitrogen-containing atmosphere (e.g., nitrogen, ammonia, and combinations, although other nitrogen-containing atmospheres may be useful). Preferably, the carbon source is a particulate carbon source. In another aspect, to enhance the conversion rate and/or the extent of conversion, a flowing gas atmosphere is preferred over a static gas atmosphere. In both cases, a positive pressure of gas is preferred.

Suitable particulate carbon sources include graphite, coke, carbon powder, carbon black, organic substances which produce carbon upon pyrolysis in an non-oxidizing atmosphere, and mixtures thereof. The carbon source may be crystalline or amorphous.

Preferably, the particulate carbon source is a fine powder intimately contacting the surface of the alumina-based abrasive grain. The average particle size of the carbon source is, preferably, less than about 50 micrometers (−325 mesh), although larger particle sizes are also useful.

The carbon source can also be provided by coating the abrasive particles with a suitable carbon containing material such as polyvinyl alcohol or an organic resin (e.g., a phenolic resin). Phenolic resins are commercially available and include that marketed by Union Carbide of Danbury, Conn. under the trade designation "BKUA-2370-UCAR". The phenolic resin can be coated onto the abrasive particles by conventional techniques, including mixing the resin and abrasive particles together, curing the resin, and then, if necessary, gently breaking up any agglomeration of abrasive particles that are bonded together by the resin. To facilitate coating, the viscosity of the phenolic resin can be adjusted by conventional techniques including diluting the resin with a suitable solvent (e.g., in the case of the Union Carbide phenolic resin, a suitable solvent is, for example, methanol).

It is understood that the coating of carbon containing material has, for example, a thickness and/or porosity that allows the metal oxide to react to form the metal nitride. For example, if the coating is too thick or too dense, the reaction allowing the metal oxide to form the metal nitride may be impeded or minimized.

The abrasive particles with the cured resin thereon, can be heated in an evacuated chamber so that the cured phenolic resin is carbonized (i.e., to provide a carbonaceous material). The term "carbonaceous" or "carbonaceous material" refers to a carbon matrix or coating wherein substantially all of the carbon is typically amorphous. Preferably, the carbonization temperature is in the range from about 400° C. to about 600° C. and, more preferably, in the range from about 450° C. to about 500° C. For additional details regarding providing a carbonaceous material, see, for example, U.S. Pat. No. 5,411,763 (Weaver et al.), the disclosure of which is incorporated herein by reference.

Another method for providing the carbon source involves treating the abrasive particles with a carbon depositing gas, for example, a hydrocarbon (e.g., propylene, methane, or ethane), which decomposes at elevated temperatures (e.g., about 1100° C.) to deposit a carbonaceous layer on the abrasive particles. For additional details regarding providing a carbonaceous layer from a carbon containing gas, see, for example, U.S. Pat. No. 5,411,763 (Weaver et al.), the disclosure of which is incorporated herein by reference.

In addition to the carbon source(s), inert particulates may be mixed together with the abrasive particles. In some instances, for example, these inert powders may allow for enhanced conversion rates by allowing enhanced circulation of gases.

Heating apparatuses suitable for use in the method according to the present invention include kilns and furnaces such as tube furnaces, tunnel ovens, rotary kilns, and pusher plate furnaces, a version of which is disclosed in U.S. Ser. No. 08/173,992 (Conwell et al.), filed Dec. 28, 1993, now allowed, the disclosure of which is incorporated herein by reference. Useful commercially available furnaces include those from Harrop Industries of Columbus, Ohio, and Thermal Technology of Santa Rose, Calif., (manufacturer of "Astro-Furnaces").

Preferably, the abrasive particles are thoroughly mixed with a particulate carbon source and placed in a container (preferably, a graphite crucible or boat), which is placed in a suitable heating apparatus. To facilitate control of the heating atmosphere, as well as to allow product gases (e.g., CO) to escape, the container is preferably not completely enclosed.

The time and temperature for converting metal oxide to metal nitride are generally interdependent. Further, the time and/or temperature may also depend on the quantity of abrasive particles, the surface area of the individual abrasive particles, the composition of the abrasive particles, the porosity of the metal oxide, and the flow, pressure, and nitrogen concentration of the nitrogen-containing gas. Once aware of the present invention, one skilled in the art will be able to determine the appropriate operating conditions for a particular run. To avoid or minimize undesirable grain growth in the abrasive particle, it is preferred that the time not be excessively long, nor the temperature be excessively high.

Generally, the conversion of the metal oxide to metal nitride proceeds faster as the porosity of the oxide increases (i.e., the density decreases), and as the thickness and particulate size (if the metal oxide comprises a particulate coating) decreases. The atmosphere in which conversion occurs, can also affect the time needed for the conversion. Preferred conversion times are between about 5 minutes and about 6 hours (preferably between about 30 minutes and about 2 hours).

The conversion temperature is generally dependent on the factors as described above for the time for conversion. Typically, a temperature of greater than 1000° C. is needed for the conversion, (typically about 1100° C. to about 1400° C.), although both lower and higher temperatures may also be useful.

The resulting metal nitride coating generally retains the physical characteristics (e.g., thickness, density, porosity, surface coverage) of the original metal oxide coating. Typically, the oxide to nitride conversion is carried to complete conversion, however it is possible that the metal oxide coating may not be converted to metal nitride in its entirety. Depending, for example, on the thickness and density of the coating, there may be a gradient across the thickness of the coating, wherein the oxide concentration being greatest near the abrasive particle core and the metal nitride being greatest at the outer surface of the abrasive grain. In another aspect, in general, as the density and/or size of the metal oxide particulates increases, the oxide particulates may be partially converted to metal nitride, resulting in a gradient across the diameter of the particulate with the metal oxide concentration being greatest at the center.

It is within the scope of the present invention to convert the metal oxide to metal oxynitride or metal carbonitride. Further, it is within the scope of the present invention for the metal oxide to be converted to metal nitride to comprise a combination of metal oxides, (e.g., zirconium oxide and titanium oxide, wherein the resulting metal nitride coating will include a heterogeneous mixture of zirconium and titanium nitrides). If the conversion is carried out to completion, the resulting metal nitride coating generally has the same atomic ratio of metals present as nitrides as the initial atomic ratio of metals present as oxides.

Abrasive Products

Abrasive grain made according to the method of the present invention can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include a binder and abrasive particles, at least a portion of which is abrasive grain made according to the method of the present invention secured within the abrasive product by the binder. Methods of making such abrasive products are well known to those skilled in the art. Furthermore, abrasive grain made according to the method of the present invention can be used in abrasive applications that utilize slurries of abrading compounds (e.g., polishing compounds).

Coated abrasive products generally include a backing, abrasive grain, and at least one binder to hold the abrasive grain on the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. Nos. 4,734,104 (Broberg) and 4,737,163 (Larkey), the disclosures of which are incorporated herein by reference.

The coated abrasive product can have an attachment means on its back surface to secure the coated abrasive product to a support pad or backup pad. Such attachment means can be, for example, a pressure sensitive adhesive or a loop fabric for a hook and loop attachment. The back side of the coated abrasive product may also contain a slip resistant or frictional coating. Examples of such coatings include an inorganic particulate material (e.g., calcium carbonate or quartz) dispersed in an adhesive.

An example of a coated abrasive product is depicted in FIG. 1. Referring to this figure, coated abrasive product 10 has a backing (substrate) 12 and abrasive layer 13. Abrasive layer 13 includes abrasive grain 14 secured to a major surface of backing 12 by make coat 15 and size coat 16. In some instances, a supersize coat (not shown) is used.

Figure 2:
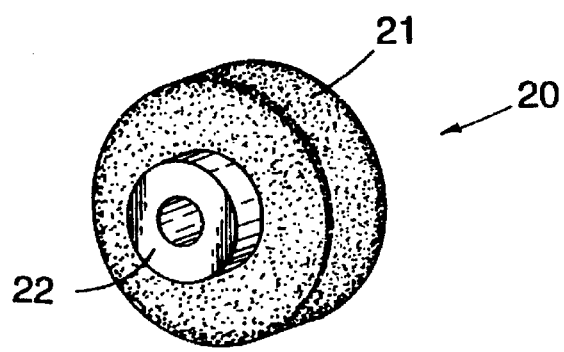
FIG. 2 is a perspective view of a bonded abrasive product.

Bonded abrasive products typically include a shaped mass of abrasive grain held together by an organic, metallic, or vitrified binder. Such shaped mass can be, for example, in the form of a wheel, such as a grinding wheel or a cutoff wheel. It can also be in the form, for example, of a honing stone or other conventional bonded abrasive shape. It is preferably in the form of a grinding wheel. In FIG. 2, wheel 20 is depicted, which includes abrasive grain 21, at least a portion of which is abrasive grain made according to the method of the present invention molded in a wheel and mounted on hub 22. For further details regarding bonded abrasive products, see, for example, U.S. Pat. No. 4,997,461 (Markhoff-Matheny et al.), the disclosure of which is incorporated herein by reference. Preferred binders that can be used are curable at temperatures and under conditions that will not adversely affect the abrasive grain.

Figure 3:
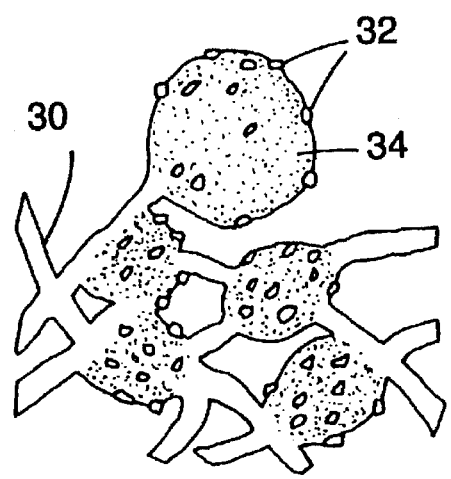
FIG. 3 is an enlarged schematic view of a nonwoven abrasive product.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 30 as a substrate, onto which abrasive grain 32, at least a portion of which is abrasive grain made according to the method of the present invention, adhered by binder 34. For further details regarding nonwoven abrasive products, see, for example, U.S. Pat. No. 2,958,593 (Hoover et al.), the disclosure of which is incorporated herein by reference.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or the filler.

The binder can also contain filler materials or grinding aids, typically in the form of a particulate material. Typically, the particulate materials are inorganic materials. Examples of particulate materials that act as fillers include metal carbonates, silica, silicates, metal sulfates, and metal oxides. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; and graphite. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

The abrasive products can contain 100% abrasive grain made according to the method of the present invention, or they can contain a blend of such abrasive grain with conventional abrasive particles and/or diluent particles. However, at least about 15% by weight, and preferably about 50–100% by weight, of the abrasive particles in the abrasive products should be abrasive grain made according to the method of the present invention. Examples of suitable conventional abrasive particles include fused aluminum oxide, silicon carbide, garnet, fused alumina zirconia, and sol-gel-derived abrasive particles. Examples of suitable diluent particles include marble, gypsum, flint, silica, iron oxide, aluminum silicate, glass, metal oxide bubbles, hollow clay spheres, porous clay pellets, solid or hollow glass spheres, expanded silaceous materials, hollow or solid resin spheres, and diluent agglomerates. Abrasive grain made according to the method of the present invention can also be combined in or with abrasive agglomerates. An example of an abrasive agglomerate is described in U.S. Pat. Nos. 4,311,489 (Kressner), 4,652,275 (Bloecher et al.), and 4,799,939 (Bloecher et al.), the disclosures of which are incorporated herein by reference.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Examples 1 and 2

Example 1 and 2 abrasive grain were prepared by dispersing 28.5 parts of boehmite (commercially available from Condea Chemical under the trade designation "DISPERAL") in 72.1 parts of acidified water (produced by adding 2.3 parts nitric acid to 69.8 parts of deionized water). The resulting sol was dried over 24 hours to provide a friable solid that was crushed with a pulverizer (type U.A., manufactured by Braun Corp., Los Angeles, Calif.) and screened to about 0.125 to 2 mm. The screened, dried sol was calcined in a rotary kiln (122 cm long, 15.24 cm inner diameter, stainless steel tube) at about 650° C. with a residence time of about 1 minute at 650° C. to substantially remove the bound volatiles. These particles are referred to as calcined, alumina particles.

A rare earth oxide solution was prepared by blending a lanthanum, neodymium, and yttrium nitrate solution (20.5% La(NO$_3$)$_3$.6H$_2$O), 20.1% Nd(NO$_3$)$_3$.6H$_2$O, 26.1% Y(NO$_3$)$_3$.6H$_2$O; available from Molycorp of Lourviers, Colo.) with a sufficient amount of magnesium nitrate solutions (11% Mg(NO$_3$)$_3$.6H$_2$O; available from Mallinckrodt Chemical of Paris, Ky.) and cobalt nitrate solution (15% Co(NO$_3$)$_2$.6H$_2$O; available from Hall Chemical of Wickliffe, Ohio) to provide a solution containing about 5.8% Nd (NO$_3$)$_3$.6H$_2$O, about 7.1% Y(NO$_3$)$_3$.6H$_2$O, about 14.4% Mg (NO$_3$)$_2$.6H$_2$O, about 0.4% Co(NO$_3$)$_2$.6H$_2$O, and the balance deionized water.

250 grams of the calcined, alumina particles were impregnated with 125 ml of the rare earth oxide solution, and then partially dried with an air blower. The resulting material was dried at 150° C. for about 1 hour, calcined again at about 650° C. in the rotary kiln for about 1 minute, and then sintered in a rotary kiln (7.5 cm inner diameter, 120 cm long rotary SiC tube) at 1400° C. for 5 minutes.

Example 1 abrasive grain were prepared by combining 10 grams of the abrasive particles prepared above with 10 grams of graphite powder, having a Fisher size of 1.95 micrometer, (commercially available from Cerac, Inc. of Milwaukee, Wis., under stock number 6-1059) in a graphite crucible (about 7.5 cm long, 2.5 cm wide, and 2 cm deep). The crucible was placed into a mullite tube furnace. The tube furnace was about 117 cm long and had a 7.6 cm outside diameter. The tube furnace was sealed and flushed with nitrogen gas for 2 hours. A flowing atmosphere of nitrogen, having a positive pressure of about $2.07 N/cm^2$ (3 psi) was established through the tube furnace. The temperature of the tube furnace was raised to about 1225° C. (interior temperature) and held for 1 hour. After the furnace was cooled to room temperature, the crucible was removed and the graphite powder was separated from the abrasive grain by screening. The resulting grain had a gray/gold color.

Example 2 abrasive grain were made as described for Example 1 except 20 grams of the abrasive particles were mixed with 5 grams of the graphite powder and heated at about 1325° C. for 90 minutes. The resulting abrasive grain had a shiny gray/gold appearance.

Comparative Example A and Example 3

Comparative Example A abrasive particles were prepared as described for the abrasive particles used in Examples 1 and 2.

Example 3 abrasive grain were prepared by combining 50 grams of Comparative Example A abrasive particles with 10 grams of the graphite powder. This mixture was placed into a graphite crucible (about 15 cm long, 6.5 cm wide, and 1.5 cm deep) which was then placed into a mullite tube furnace. The tube furnace was sealed, a vacuum was pulled to remove any air, and a nitrogen gas pressure of about $2.07 N/cm^2$ (3 psi) was established. The tube furnace and contents were heated to about 1325° C. and kept at temperature for 2 hours. At the end of the 2 hours, the power was shut off and the furnace was allowed to cool to room temperature. Flow of nitrogen gas with a back pressure $2.07 N/cm^2$ (3 psi) was maintained during the heating. The abrasive grain were separated from the graphite by screening and were further washed with water and dried.

ANSI Grade 50 Comparative Example A abrasive particles and Example 3 abrasive grain were each incorporated into abrasive discs. The coated abrasive discs were made according to conventional coated abrasive making procedures. The abrasive particles or abrasive grain were bonded to vulcanized fiber backings that were 17.8 cm in diameter and contained a 2.2 cm center hole. The make resin was a conventional calcium carbonate filled phenolic. The abrasive particles or abrasive grain were electrostatically applied to the make resin, which was then precured for 90 minutes at 88° C. The size resin was a conventional cryolite filled phenolic which was applied over the abrasive particles or abrasive grain and then precured for 90 minutes at 88° C. followed by a final cure of 10 hours at 100° C. After curing, the fiber discs were flexed.

For testing, a coated abrasive disc was mounted on a beveled aluminum back-up pad, and used to grind the face of a stainless steel 1.25 cm by 18 cm workpiece. The disc was driven at 5500 rpm while the portion of the disc overlaying the beveled edge of the back-up pad contacted the workpiece at about a 6 kg load. Each disc was used to grind a separate 304 stainless steel workpiece for a one-minute interval for a total time of 10 minutes, unless otherwise indicated. The total cut was the summation of the amount of metal removed throughout the test duration.

Two discs of both Example 3 and Comparative Example A were tested and the respective results averaged. The Example 3 coated abrasive discs had an average total cut that was 107% of the total cut of the Comparative Example A coated abrasive discs. Comparative Example B, Example 4, and Illustrative Example I.

Comparative Example B abrasive particles were prepared by impregnating 500 grams of the calcined, alumina particles (prepared as described in Examples 1 and 2) with 250 ml of the rare earth oxide solution (prepared as described in Examples 1 and 2), to which a sufficient amount of $Co(NO_3)$ .$6H_2O$ had been added to provide a solution with 8% $Co(NO_3)$. The impregnated alumina particles were calcined a second time, and sintered at 1400° C. for 5 minutes. The resulting particles had a coating of about 1% CoO, and were screened to ANSI Grade 36.

Illustrative Example I abrasive grain were prepared by filling a graphite crucible (about 6.5 cm inner diameter by about 15 cm high) about one-half full with Comparative Example B abrasive particles. A lid was placed on top, and the crucible and contents were heated at 1500° C. for 60 minutes in an Astro (TM) furnace (obtained from Thermal Technology, Santa Rose, Calif.) under a flowing nitrogen atmosphere and with a back pressure of $2.07 N/cm^2$ (3 psi). The resulting abrasive grain did not have the gold color, but were uniformly gray, possibly as a result of unavailability of nitrogen due to the lid on top of the graphite crucible.

Example 4 abrasive grain were prepared as described in Example 3, except 50 grams of Comparative Example B abrasive particles were used rather than the Comparative Example A abrasive particles.

ANSI Grade 36 Comparative Example B abrasive particles and Illustrative Example I abrasive grain, were each incorporated into abrasive discs as described above. For Comparative Example B, one disc was tested, and for Illustrative Example I, two discs were tested.

The Illustrative Example I coated abrasive discs had an average total cut that was 70% of the total cut of the Comparative Example B abrasive disc.

Comparative Example B abrasive particles and Example 4 abrasive grain were each incorporated into coated abrasive discs and tested on 304 stainless steel workpieces as described above.

The Example 4 coated abrasive discs had an average total cut that was 107% of the total cut of the Comparative Example B abrasive discs.

Examples 5 and 6

Examples 5 and 6 were prepared by combining 250 grams of the calcined, alumina particles (prepared as described in Examples 1 and 2) with 125 ml of the rare earth oxide solution (prepared as described in Examples 1 and 2), and partially dried with an air blower. 200 ml of a solution containing 50 grams of titanium tetrabutyl alkoxide in isopropyl alcohol was coated onto the impregnated alumina particles by mixing the 250 grams of the impregnated alumina particles with the alkoxide solution. The particles were then dried at 150° C. for about 1 hour. The dried particles were calcined a second time at about 650° C., and sintered in the rotary kiln at 1400° C. for 5 minutes. The resulting sintered abrasive particles included a coating of $TiO_2$.

Example 5 abrasive grain were prepared by mixing 10 grams of the $TiO_2$ coated abrasive particles (prepared as described in the preceding paragraph) with 10 grams of the graphite powder and heating as described in Example 1. The resulting abrasive grain had a gray/gold color.

Example 6 abrasive grain were prepared as described in Example 5 except 20 grams of the $TiO_2$ coated abrasive particles were mixed with 5 grams of the graphite powder and heated to 1325° C. for 2 hours. The resulting abrasive grain had a grey/gold color.

Example 7 abrasive grain were prepared by mixing 500 grams of the calcined alumina particles (prepared as described in Examples 1 and 2) with 250 ml of the rare earth oxide solution (prepared as described in Examples 1 and 2) into which 40 grams of $ZrO_2$ sol (20 weight percent $ZrO_2$; obtained from The PQ Corporation under the trade designation "Nyacol Zr 150/20") had been mixed. The impregnated alumina particles were partially dried and calcined a second time, and sintered in the rotary kiln at 1400° C. for 5 minutes. The resulting abrasive particles had about 1.5% $ZrO_2$ present as a coating. 20 grams of these $ZrO_2$ coated abrasive particles were mixed with 5 grams of the graphite powder, and heated for 2 hours under the conditions of Example 2. The resulting abrasive grain had a gray outer surface with a gold colored ZrN coating.

Comparative Example C and Example 8

Comparative Example C abrasive particles were prepared in the same manner as the 1.5% $ZrO_2$ coated abrasive particles of Example 7, and were screened to ANSI Grade 50.

Example 8 abrasive grain were prepared as described in Example 6, except 50 grams of Comparative Example C abrasive particles were used. The resulting abrasive grain had a gold/bronze color, indicating conversion of at least a portion of the $ZrO_2$ coating to ZrN.

Comparative Example C abrasive particles and Example 8 abrasive grain were each incorporated into coated abrasive discs and tested on 304 stainless steel workpieces as described above.

The Example 8 coated abrasive discs had an average total cut that was 119% of the total cut of the Comparative Example C abrasive discs.

Comparative Examples D and E and Examples 9 and 10

Comparative Example D abrasive particles were prepared by impregnating 1000 grams of the calcined, alumina particles (prepared as described in Examples 1 and 2) with 500 ml of the rare earth oxide solution (prepared as described in Examples 1 and 2). 150 ml of a solution containing 25 grams of zirconium-n-propoxide (commercially available from Alfa of Danver, Mass.) in isopropyl alcohol was coated onto the impregnated alumina particles by mixing the 1000 grams of impregnated alumina particles with the zirconium-npropoxide solution. The particles were dried with an air blower. The alkoxide coated, impregnated alumina particles were calcined a second time and sintered in the rotary kiln at 1400° C. for 5 minutes. The resulting abrasive particles having a coating of $ZrO_2$ were screened to ANSI Grade 50.

Comparative Example E abrasive particles were prepared by impregnating 500 grams of the calcined, alumina particles (prepared as described in Examples 1 and 2) with 250 ml of the rare earth oxide solution (prepared as described in Examples 1 and 2). 35 grams of titanium isopropoxide was mixed with isopropyl alcohol to produce a final volume of 150 ml. This solution was coated on the impregnated partially dried abrasive particles. The impregnated, coated abrasive particles were calcined a second time and sintered at 1400° C. for 5 minutes through the rotary kiln. The resulting abrasive particles had a coating of $TiO_2$, and were screened to ANSI Grade 50.

Example 9 abrasive grain were prepared as described in Example 6, except 50 grams of Comparative Example D abrasive particles were mixed with 10 grams of the graphite powder. At least a portion of the $ZrO_2$ coating was converted to ZrN, having a gold/bronze color. The abrasive grain had a gray color throughout.

Example 10 abrasive grain were prepared as described in Example 9, except 50 grams of Comparative Example E abrasive particles were used, and heating and cooling were under a nitrogen atmosphere, and soaking was under an $NH_3$ atmosphere. At least a portion of the $TiO_2$ coating was converted to TiN having an amber/gold color. The abrasive grain were gray throughout.

Comparative Example D abrasive particles and Example 9 abrasive grain were each incorporated into abrasive discs and tested on 304 stainless steel as described above.

The Example 9 coated abrasive discs had an average total cut that was 130% of the total cut of the Comparative Example D abrasive discs.

Comparative Example E abrasive particles and Example 10 abrasive grain were incorporated into abrasive discs and tested on 1018 mild steel workpieces to a 12 minute endpoint as described above.

The Example 10 coated abrasive discs had an total cut that was 117% of the total cut of the Comparative Example E coated abrasive discs.

Comparative Example F and Examples 11 and 12

Comparative Example F abrasive particles were prepared by impregnating 1000 grams of the calcined abrasive particles (prepared as described in Examples 1 and 2) with 500 ml of the rare earth oxide solution (prepared as described in Examples 1 and 2) to which 90 grams of $ZrO_2$ sol (20 wt-% $ZrO_2$; obtained from Nyacol under the trade designation "Nyacol 150/20") was added. The impregnated material was calcined a second time and sintered at 1400° C. for 5 minutes in the rotary kiln. The resulting abrasive particles had about 1.5% $ZrO_2$ present as a coating, and were screened to ANSI Grade 40.

Example 11 abrasive grain were prepared as described in Example 10, except 50 grams of Comparative Example F abrasive particles were used. At least a portion of the $ZrO_2$ coating was converted to ZrN having a golden color. The abrasive grain were gray throughout.

Example 12 abrasive grain were prepared as described in Example 11, except heating, soaking, and cooling was in a 90/10 nitrogen/hydrogen atmosphere. At least a portion of the $ZrO_2$ coating was converted to ZrN having a golden color. The abrasive grain were gray throughout.

ANSI Grade 40 Comparative Example F abrasive particles and Example 12 abrasive grain were each incorporated into abrasive discs and tested on titanium workpieces to a 4 minute endpoint, and on 304 stainless steel workpieces to a 10 minute endpoint, as described above.

On titanium, the Example 12 coated abrasive discs had an average total cut that was 142% of the total cut of the Comparative Example F coated abrasive discs.

On stainless steel, the Example 12 coated abrasive discs had an average total cut that was 106% of the total cut of the Comparative Example F coated abrasive discs.

In another run, ANSI Grade 40 Comparative Example F abrasive particles were mixed with 10 grams of soluble starch powder and further processes as described in Example 11 except that the atmosphere was 100% nitrogen. The mullite tube, however, cracked about half-way during the heat-up, so the run was not completed. The starch had foamed and flowed over the crucible but had coated the abrasive particles.

Comparative Example G & Examples 13–16

Comparative Example G abrasive particles were prepared as described in Comparative Example F, except that a $ZrO_2$-nitrate sol with finer particle size (5–10 nm, available from Nyacol under the trade designation "Nyacol Zr 10/20") was used. The resulting abrasive particles had a $ZrO_2$ coating, and were screened to ANSI Grade 50.

Example 13 abrasive grain were prepared as described in Example 12, except 50 grams of Comparative Example G abrasive particles were used, and heating was in a 85/15 nitrogen/hydrogen atmosphere. At least a portion of the $ZrO_2$ coating was converted to ZrN having a gold/brown color.

Example 14 abrasive grain were prepared as described in Example 13, except 5 grams of the graphite was used and heating was for 30 minutes. At least a portion of the $ZrO_2$ coating was converted to ZrN.

Example 15 abrasive grain were prepared as described in Example 14, except heating was for 60 minutes. At least a portion of the $ZrO_2$ coating was converted to ZrN.

Example 16 abrasive grain were prepared as described in Example 13, except 125 grams Comparative Example G abrasive particles were used. At least a portion of the $ZrO_2$ coating was converted to ZrN.

Abrasive particles/grain from Comparative Example G and Examples 14, 15, and 16 were each incorporated into abrasive discs as described above. The discs were tested on 1018 mild steel workpieces to a 12 minute endpoint, as described above.

The Example 14 coated abrasive discs had an average total cut that was 102% of the total cut of the Comparative Example G coated abrasive discs; the Example 15 coated abrasive discs had an average total cut that was 108% of the total cut of the Comparative Example G coated abrasive discs; and the Example 16 coated abrasive discs had an average total cut that was 105% of the total cut of the Comparative Example G coated abrasive discs.

Comparative Example H & Example 17

Comparative Example H abrasive particles were prepared by impregnating 500 grams of the calcined alumina particles (prepared as described in Examples 1 and 2) with 250 ml of the rare earth oxide solution (prepared as described in Examples 1 and 2) to which 3.5 grams of fumed $TiO_2$ powder (obtained from DeGussa Corp., Teterboro, N.J., under the trade designation "TITANDIOXID P-25") and 14 grams of the 20 wt-% $ZrO_2$ sol were added. The impregnated particles were fired at 1400° C. for 5 minutes in the rotary kiln. The resulting particles were coated with $TiO_2/ZrO_2$ mixture, and were screened to ANSI Grade 36.

Example 17 abrasive grain were prepared as described in Example 15 except. 50 grams of Comparative Example H abrasive particles were used. The $TiO_2/ZrO_2$ coating was converted to a TiN/ZrN coating having a gold color.

Comparative Example H abrasive particles and Example 17 abrasive grain were each incorporated into abrasive discs and tested on 1018 mild steel workpieces to a 12 minute endpoint as described above.

The Example 17 coated abrasive discs had an average total cut that was 106% of the total cut of the Comparative Example H coated abrasive discs.

Comparative Example I & Example 18

Comparative Example I abrasive particles were an ANSI Grade 60 fused alumina-zirconia abrasive particles, commercially available from Norton Co., under the trade designation "NZX".

Example 18 abrasive grain were prepared as described in Example 15 except 50 grams of Comparative Example I abrasive particles were used. A surface layer was formed in which $ZrO_2$ was converted to ZrN having a gold/brown color.

ANSI Grade 60 Comparative Example I abrasive particles and Example 18 abrasive grain were incorporated into abrasive discs and tested on 1018 mild steel workpieces to a 12 minute endpoint as described above.

The Example 18 coated abrasive discs had an average total cut that was 108% of the total cut of the Comparative Example I coated abrasive discs.

Comparative Example J & Example 19

Comparative Example J abrasive particles were an ANSI Grade 40 blue fused alumina abrasive particles, commercially available from Norton Co., under the trade designation "FSX", onto which a $TiO_2$ layer was coated. The $TiO_2$ layer was prepared by mixing 3.5 grams of the fumed $TiO_2$ ("TITANDIOXID P-25") into 25 grams of water. This dispersion was mixed with 100 grams of the fused alumina abrasive particles. These abrasive particles were then dried and fired at 1300° C. for 30 minutes. The resulting abrasive particles had a $TiO_2$ coating.

Example 19 abrasive grain were prepared as described in Example 15 except 50 grams of Comparative Example J abrasive particles were used, and heated for 2 hours.

ANSI Grade 40 Comparative Example J abrasive particles and Example 19 abrasive grain were each incorporated into abrasive discs and tested on 1018 mild steel workpieces to a 12 minute endpoint as described above.

The Example 19 coated abrasive discs had an average total cut that was 109% of the total cut of the Comparative Example J coated abrasive discs.

Comparative Example K & Example 20

Comparative Example K abrasive particles were an ANSI Grade 40 blue fused alumina, commercially available from Norton Co., under the trade designation "FSX", onto which a $ZrO_2$ layer was coated. The $ZrO_2$ layer was prepared by mixing 18 grams of the 20 wt-% $ZrO_2$ sol (giving 3.5 g $ZrO_2$) in water. This dispersion was then added to 100 grams of the blue fused alumina abrasive particles. These abrasive particles were then dried and fired at 1300° C. for 30 minutes. The resulting abrasive particles had a $ZrO_2$ coating.

Example 20 abrasive grain were prepared as described in Example 19 except 50 grams of Comparative Example K abrasive particles were used.

ANSI Grade 40 Comparative Example K abrasive particles and Example 20 abrasive grain were each incorporated into abrasive discs and tested on 1018 mild steel workpieces to a 12 minute endpoint as described above.

The Example 20 coated abrasive discs had an average total cut that was 100% of the total cut of the Comparative Example L coated abrasive discs.

Comparative Example L & Example 21

Comparative Example L abrasive particles were prepared as described in Examples 1 and 2, except the gel was shaped into triangles as taught by U.S. Pat. No. 5,201,916 (Berg et al.) before calcining. 150 grams of these calcined alumina triangles were impregnated with 75 ml of the rare earth oxide solution (prepared as described in Examples 1 and 2) to which 12 grams of the 20 wt-% $ZrO_2$ sol had been added. The resulting impregnated particles were dried and fired at 1400° C. for 5 minutes.

Example 21 abrasive grain were prepared as described in Example 15 except 60 grams of Comparative Example L abrasive particles were mixed with 10 grams of the graphite. The resulting abrasive grain were coated with ZrN.

ANSI Grade 24 Comparative Example L abrasive particles and Example 21 abrasive grain were each incorporated into abrasive discs and tested on 1018 mild steel workpieces to a 12 minute endpoint as described above.

The Example 21 coated abrasive discs had an average total cut that was 103% of the total cut of the Comparative Example L coated abrasive discs.

The abrasive particles used to make Example 22 were prepared as described in Comparative Example L except the gel contained iron oxide nucleating material and was extruded into rods. The iron oxide nucleating material was an aqueous dispersion of iron oxyhydroxide (gamma-FeOOH), lepidocrocite, acicular particles with an average particle size of about 0.05 to 0.1 micrometer. The resulting abrasive rods contained, on a theoretical basis, 2% $Fe_2O_3$. The nitride coated abrasive grain were prepared as described in Example 21, except 60 grams of the iron oxide containing abrasive grain (rods) described above, were used. The resulting abrasive grain were coated with ZrN.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making an alpha alumina-based abrasive grain, said method comprising heating a plurality of alpha alumina-based abrasive particles each having an outer surface including metal oxide, in the presence of a carbon source, for a time, at a temperature, and under a non-oxidizing, nitrogen containing atmosphere, sufficient to convert at least a portion of said metal oxide to metal nitride.

2. The method according to claim 1, wherein said carbon source is a particulate carbon source.

3. The method according to claim 2, wherein at least a portion of said alpha alumina-based abrasive particles each comprise an alpha alumina-based core having an outer surface and a metal oxide coating covering at least a portion of said outer surface of said core.

4. The method according to claim 3, wherein said metal oxide coating has an average thickness in the range from about 0.1 to about 20 micrometers.

5. The method according to claim 3, wherein said metal oxide coating comprises metal oxide particulate.

6. The method according to claim 5, wherein said metal oxide coating covers at least 70% of said outer surface of said core.

7. The method according to claim 5, wherein said coating has a thickness in the range from about 0.1 to about 20 micrometers.

8. The method according to claim 5, wherein said metal oxide particulate is autogenously bonded to said outer surface of said core.

9. The method according to claim 3, wherein said metal oxide coating covers at least 70% of said outer surface of said core.

10. The method according to claim 3, wherein said metal oxide coating is selected from the group consisting of oxides of titanium, zirconium, aluminum, boron, chromium, silicon, vanadium, tantalum, hafnium, niobium, and combinations thereof.

11. The method according to claim 2, wherein at least a portion of said alpha alumina-based abrasive particles are sintered, polycrystalline alpha alumina-based ceramic particles.

12. The method according to claim 2, wherein at least a portion of said abrasive particles each comprise a sintered, polycrystalline alpha alumina-based ceramic core having an outer surface and a metal oxide coating covering at least a portion of said outer surface of said core.

13. The method according to claim 12, wherein said metal oxide coating is selected from the group consisting of the oxides of titanium, zirconium, aluminum, chromium, boron, silicon, vanadium, tantalum, hafnium, niobium, and combinations thereof.

14. The method according to claim 12, wherein said metal oxide coating covers at least 70% of said outer surface of said core.

15. The method according to claim 2, wherein said particulate carbon source is graphite powder.

16. The method according to claim 2, wherein said particulate carbon source is carbon powder.

17. The method according to claim 2, wherein said atmosphere is selected from the group consisting of nitrogen, ammonium, and combinations.

18. The method according to claim 1, wherein said carbon source is a carbonaceous material present on said outer surface of said abrasive particles.

19. The method according to claim 1, wherein said carbon source is cured phenolic resin present on said outer surface of said abrasive particles.

20. A method of making an abrasive article, said method comprising the steps of:
    (a) heating a plurality of alpha alumina-based abrasive particles, each having an outer surface including metal oxide, in the presence of a carbon source, for a time, at a temperature, and under a non-oxidizing nitrogen containing atmosphere, sufficient to convert at least a portion of said metal oxide to metal nitride to provide a plurality of abrasive grain having an outer surface at least of portion of which comprises metal nitride; and
    (b) combining said abrasive grain with binder to provide an abrasive article.

21. The method of making an abrasive article according to claim 20 wherein said binder is an organic binder.

* * * * *